United States Patent
Somech et al.

(10) Patent No.: US 8,355,405 B2
(45) Date of Patent: Jan. 15, 2013

(54) SELECTIVE SESSION INTERCEPTION METHOD

(75) Inventors: Ovadi Somech, Rishon Le'zion (IL); Guy Sheffi, Ra'anana (IL)

(73) Assignee: B-Obvious Ltd., Herzlia Pituach (IL)

( * ) Notice: Subject to any disclaimer, the term of this patent is extended or adjusted under 35 U.S.C. 154(b) by 138 days.

(21) Appl. No.: 12/447,677

(22) PCT Filed: Nov. 5, 2007

(86) PCT No.: PCT/IL2007/001345
§ 371 (c)(1), (2), (4) Date: Apr. 29, 2009

(87) PCT Pub. No.: WO2008/059478
PCT Pub. Date: May 22, 2008

(65) Prior Publication Data
US 2010/0054261 A1 Mar. 4, 2010

Related U.S. Application Data

(60) Provisional application No. 60/858,390, filed on Nov. 13, 2006.

(51) Int. Cl.
*H04L 12/28* (2006.01)
(52) U.S. Cl. .......... 370/400; 709/217
(58) Field of Classification Search .......... 370/400; 709/217
See application file for complete search history.

(56) References Cited

U.S. PATENT DOCUMENTS

| | | | |
|---|---|---|---|
| 6,687,732 B1 | 2/2004 | Bector et al. | |
| 7,126,908 B1 | 10/2006 | Lu et al. | |
| 7,313,593 B1* | 12/2007 | Pulito et al. | 709/204 |
| 2002/0048269 A1* | 4/2002 | Hong et al. | 370/389 |
| 2002/0116523 A1* | 8/2002 | Warrier et al. | 709/238 |
| 2002/0133596 A1 | 9/2002 | Border et al. | |
| 2003/0014684 A1* | 1/2003 | Kashyap | 714/4 |
| 2004/0095907 A1* | 5/2004 | Agee et al. | 370/334 |
| 2004/0247125 A1 | 12/2004 | McClellan | |
| 2005/0160289 A1 | 7/2005 | Shay | |
| 2007/0153782 A1* | 7/2007 | Fletcher et al. | 370/389 |
| 2008/0034057 A1* | 2/2008 | Kumar et al. | 709/217 |

FOREIGN PATENT DOCUMENTS

| | | |
|---|---|---|
| IE | 20050376 | 8/2006 |
| WO | WO 2008/059478 | 5/2008 |

OTHER PUBLICATIONS

International Search Report mailed Jan. 15, 2009 for PCT/IL2007/001345 filed Nov. 5, 2007.

(Continued)

*Primary Examiner* — Robert Wilson
*Assistant Examiner* — Wei Zhao

(57) ABSTRACT

A method for intercepting data of a network session passing between a first node and a second node on a data network, comprising the steps of: (i) providing an interceptor on a third node of the network; (ii) monitoring data passing between the first node and the second node; (iii) synchronizing the network data between the interceptor and the first and second nodes; (iv) creating a first socket on the interceptor for communicating with the first node and a second socket on the interceptor for communicating with the second node, and (v) intercepting the data so that data flowing between first and second nodes passes through the interceptor.

17 Claims, 6 Drawing Sheets

OTHER PUBLICATIONS

Written Opinion of the International Searching Authority mailed Jan. 15, 2009 for PCT/IL2007/001345 filed Nov. 5, 2007.
International Preliminary Report on Patentability mailed Aug. 13, 2009 for PCT/IL2007/001345 filed Nov. 5, 2007.
Communication Pursuant to Article 94(3) EPC Dated Nov. 2, 2011 From the European Patent Office Re. Application No. 07827318.2.
Communication Pursuant to Rules 70(2) and 70a(2) EPC Dated Apr. 1, 2011 From the European Patent Office Re. Application No. 07827318.2.
Supplementary European Search Report Dated Mar. 15, 2011 From the European Patent Office Re. Application No. 07827318.2.
Cohen et al. "Supporting Transparent Caching With Standard Proxy Caches", Internet Citation, XP002166031, p. 1-11, Mar. 31, 1999.
Gundlach et al. "Dynamic, Power-Aware Scheduling for Mobile Clients Using a Transparent Proxy", Proceedings of the 2004 International Conference on Parallel Processing (ICPP'04), Montreal, QC, Canada, Aug. 15-18, 2004, XP010718687, p. 557-565, Aug. 15, 2004.
Spatscheck et al. "Optimizing TCP Forwarder Performance", IEEE/ACM Transactions on Networking, XP002224927, 8(2): 146-157, Apr. 1, 2000.
Office Action Dated Apr. 22, 2010 From the Israel Patent Office Re. Application No. 198326.
Response Dated Jul. 14, 2010 to Office Action of Apr. 22, 2010 From the Israel Patent Office Re. Application No. 198326.
Response Dated Oct. 10, 2011 to Communication Pursuant to Rules 70(2) and 70a(2) EPC of Apr. 1, 2011 From the European Patent Office Re. Application No. 07827318.2.
Examiner's Report Dated Aug. 18, 2010 From the Australian Government, IP Australia Re. Application No. 2007320794.
Examiner's Report Dated Jan. 31, 2012 From the Australian Government, IP Australia Re. Application No. 2007320794.
International Preliminary Report on Patentability Dated Aug. 9, 2009 From the International Bureau of WIPO Re. Application No. PCT/IL2007/001345.
International Search Report and the Written Opinion Dated Jan. 15, 2009 From the International Searching Authority Re: Application No. PCT/IL2007/001345.
Notification Dated Aug. 18, 2011 From the Eurasian Patent Organization (EAPO), The Eurasian Patent Office Re. Application No. 200970463 and Its Translation Into English.
Response Dated Nov. 21, 2011 to Examiner's Report of Aug. 18, 2010 From the Australian Government, IP Australia Re. Application No. 2007320794.
Response Dated Nov. 24, 2011 to Notification of Aug. 18, 2011 From the Eurasian Patent Organization (EAPO), The Eurasian Patent Office Re. Application No. 200970463.
Office Action Dated Aug. 19, 2012 From the Isreal Patent Office Re. Application No. 198326 and Its Translation Into English.
Roeckl "Stateful Inspection Firewalls. An Overview of Firewall Technology and How Juniper Networks Implements It", Juniper Networks, White Paper, p. 1-14, 2004.
Translation of Notification Dated Nov. 1, 2012 From the Eurasian Patent Organization (EAPO), The Eurasian Patent Office Re. Application No. 200970463.

\* cited by examiner

SELECTIVE SESSION INTERCEPTION METHOD

FIELD OF THE INVENTION

The present invention relates to a system and method for selectively intercepting sessions between nodes on a network to provide proxy-like services.

BACKGROUND

The Transmission Control Protocol (TCP) is a virtual circuit protocol that is one of the core protocols used in data transfer over the Internet. Using TCP, applications on networked hosts create connections to one another, over which data packets may be transferred from one application to another. The protocol guarantees reliable delivery of data from sender to receiver whilst ensuring that the data packets remain in the correct sequence. TCP also distinguishes data for multiple connections when two or more applications such as a Web server and an e-mail server, for example, are concurrently running on the same host. Consequently, TCP supports many of the Internet's most popular application protocols and thus facilitates applications, including the World Wide Web, e-mail and Secure Shell, for example.

In the Internet protocol suite, TCP is the intermediate layer between the Internet Protocol (IP) below it, and an application above it. Applications often need reliable pipe-like connections to each other, whereas the Internet Protocol does not provide such streams. TCP fulfils the task of the transport layer in the simplified OSI model of computer networks.

Applications send streams of octets (8-bit bytes) to TCP for delivery through the network, and TCP divides the byte stream into appropriately sized segments which are usually delineated by the Maximum Transmission Unit (MTU) size of the data link layer of the network that the computer running the application is attached to. TCP then passes the resulting packets to the Internet Protocol, for delivery through a network to the TCP module of the entity at the other end. TCP checks to make sure that no packets are lost by giving each packet a sequence number, which is also used to make sure that the data delivered to the entity at the far end arrives in the correct order. The TCP module at the far end sends back an acknowledgement for packets which have been successfully received; a timer at the sending TCP will cause a timeout if an acknowledgement is not received within a reasonable round-trip time (or RTT), and the (presumably lost) data will then be re-transmitted. The TCP checks that no bytes are damaged by using a checksum computed at the sender for each block of data before it is sent, and checked at the receiver.

A proxy server is a computer that offers a computer network service to allow clients to make indirect network connections to other network services. A client connects to the proxy server then requests a connection, a file, or other resource that is available on a different server. The proxy provides the resource, either by connecting to the specified server or by serving it from a cache. In some cases, the proxy may alter the client's request or the server's response for various purposes.

Transparent/Intercepting Proxies are known. With Transparent/Intercepting Proxies, communications between networked clients are intercepted and redirected to the proxy without the client-side being specially configured, and often without the client side being aware that a communication is redirected in this manner. Transparent proxies ideally intercept sessions between clients and servers, effectively splitting each client-server session into two sessions: a first session between the client and the transparent proxy and a second session between the transparent proxy and the server.

The intercepting proxy typically intercepts the TCP SYN (synchronization) message that is sent from the client node to a server node. The intercepting proxy then establishes a (virtual) socket to enable it to communicate with the client node. This socket relays a TCP SYN/ACK (synchronization acknowledgement) message to the client node.

At the same time the intercepting proxy establishes a connection to the server node by opening a separate socket that initiates the TCP triple handshake with the server node. All outgoing messages from the intercepting proxy then use the network parameters established in the original session, including the same IP addresses and the same TCP/UDP port numbers.

The traditional Transparent/Intercepting Proxy described above has several disadvantages however. For example, it will be appreciated that a Transparent/Intercepting proxy can only rely on layer 4 parameters, such as IP addresses and TCP port numbers, in order to determine whether or not to intercept a session. This leads to unnecessary session interception, heavy system loading and inefficiencies in system resource usage. For example, a system that is required to intercept a particular protocol using dynamic TCP ports has to intercept the sessions of all passing protocols in order to operate correctly. Likewise, a system that is required to intervene only when certain data such as a message or command is transferred during a session has to intercept all sessions of the given protocol in order to intervene when such an event occurs. This superfluous interception is clearly inefficient.

There is thus a need for an alternative to traditional proxy server technology and the present invention addresses this need.

SUMMARY OF THE INVENTION

The present invention relates to a system and method for selectively intercepting sessions between nodes on a network such as between a server and a client, in a manner which is not coupled with the session establishment event, and thereby provides an alternative to traditional proxy server technology.

One aspect of the present invention is directed to a method for intercepting data passing between a first node and a second node on a data network, comprising the steps of:
(i) Providing an interceptor on a third node of the network;
(ii) Monitoring data passing between the first node and the second node;
(iii) Collecting network data in order to reach synchronization between the interceptor and the first and second nodes;
(iv) Creating a first data port on the interceptor for communicating with the first node and a second data port on the interceptor for communicating with the second node;
(v) Intercepting the data so that data flowing between the first and the second nodes passes through the interceptor.

Typically, the first node is occupied by equipment acting as a Client or a Server.

Typically, the second node is occupied by equipment acting as a Client or a Server.

In one embodiment, the synchronizing is performed in parallel to the monitoring stage thereby enabling immediate interception as soon as a decision to intercept is made.

Typically, step (ii) comprises monitoring both data going from the first node to the second node and monitoring data going from the second node to the first node.

Typically, step (iii) of synchronizing the network data comprises collecting at least some of the group comprising: IP addresses, TCP ports, TCP window sizes, TCP sequence numbers, TCP acknowledgment numbers and un-acknowledged data.

Optionally, the interceptor scans passing sessions for identifying and intercepting preselected protocols without having to intercept the sessions of other passing protocols.

In a second aspect, the invention is directed to use of the interceptor as an efficient cache server for protocols using dynamic TCP ports.

Optionally, the interceptor is programmed to intervene only when predetermined data is transferred during a session, without intercepting passing data from other sessions.

In some configurations, the predetermined data may be a message or a command.

Optionally, the interceptor may be configured to intervene with data transmitted between the first node and the second node only when a certain network state is reached.

Optionally the interceptor may serve as an efficient cache server wherein the interceptor intercepts sessions only when it detects a request for data that is already stored in its local cache.

Optionally, the interceptor may be used as an efficient cache server for protocols where connection between the first node and the second node does not result in an immediate transfer of data there between.

DEFINITIONS

The term IP as used herein is an acronym for Internet Protocol, which is a data-oriented protocol, used for communicating data across a packet-switched internetwork. IP is a network layer protocol and is encapsulated in a data link layer protocol, such as Ethernet, for example. As a lower layer protocol, IP provides the service of communicable unique global addressing amongst computers.

The term IP address relates to a unique number that devices use in order to identify and communicate with each other on a computer network utilizing the Internet Protocol standard (IP).

The term TCP relates to a virtual circuit protocol that is one of the core protocols of the Internet protocol suite. Using TCP, applications running on networked hosts may create connections to one another, over which packets of data may be exchanged. The TCP protocol guarantees reliable delivery of data from sender to receiver whilst retaining the original order of the data. TCP also distinguishes data directed to multiple connections by a plurality of applications running concurrently on the same host, such as a Web server and an e-mail server, for example. In the Internet protocol suite, TCP is the intermediate layer between the Internet Protocol (IP) below it, and an application above it. Whereas applications often need reliable pipe-like connections to each other, the Internet Protocol does not provide such streams, but rather only provides unreliable packets. TCP provides a solution to this deficiency and thus TCP does the task of the transport layer in the simplified OSI model of computer networks.

The term TCP port relates to the notion of port numbers to identify sending and receiving application end-points on a host, or Internet sockets. Each side of a TCP connection has an associated 16-bit unsigned port number (1-65535) reserved by the sending or receiving application. Arriving TCP data packets are identified as belonging to a specific TCP connection by its sockets, that is, the combination of source host address, source port, destination host address, and destination port. This means that a server computer can provide several clients with several services simultaneously, as long as each client takes care of initiating any simultaneous connections to one destination port from different source ports.

The term 'TCP window size' refers to the amount of received data (in bytes) that can be buffered during a connection. The sending host can send only this amount of data before it must wait for an acknowledgment and window update from the receiving host.

By TCP sequence number, the sequence number of the first data byte in the packet is meant, unless the SYN flag is set in which case the sequence number is the ISN (Initial Sequence Number) and the first data byte has a sequence number of ISN+1.

By TCP acknowledgement number, the next sequence number the sender of the packet expects to receive is meant:

The term TCP SYN message refers to a TCP/IP packet with SYN (synchronize) flag set in the TCP header.

The term TCP SYN/ACK refers to a TCP/IP packet with SYN (synchronize) and ACK (acknowledgement) flags set in the TCP header.

By Proxy Server a server that sits between a client application, such as a Web browser, and a real server is intended. The proxy server intercepts all requests to the real server to see if it can fulfill the requests itself. Only if the proxy server cannot fulfill the request, it forwards the request on to the real server.

The term MTU is an acronym for Maximum Transmission Unit and refers to the largest physical packet size, measured in bytes that a network can transmit. Any messages larger than the MTU are divided into smaller packets before being sent.

RTT is an acronym for Round-Trip Time, and relates to the time required for a network communication to travel from the source to the destination and back. The RTT is used by some routing algorithms to aid in calculating optimal routes.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE EMBODIMENTS

Figure 1:
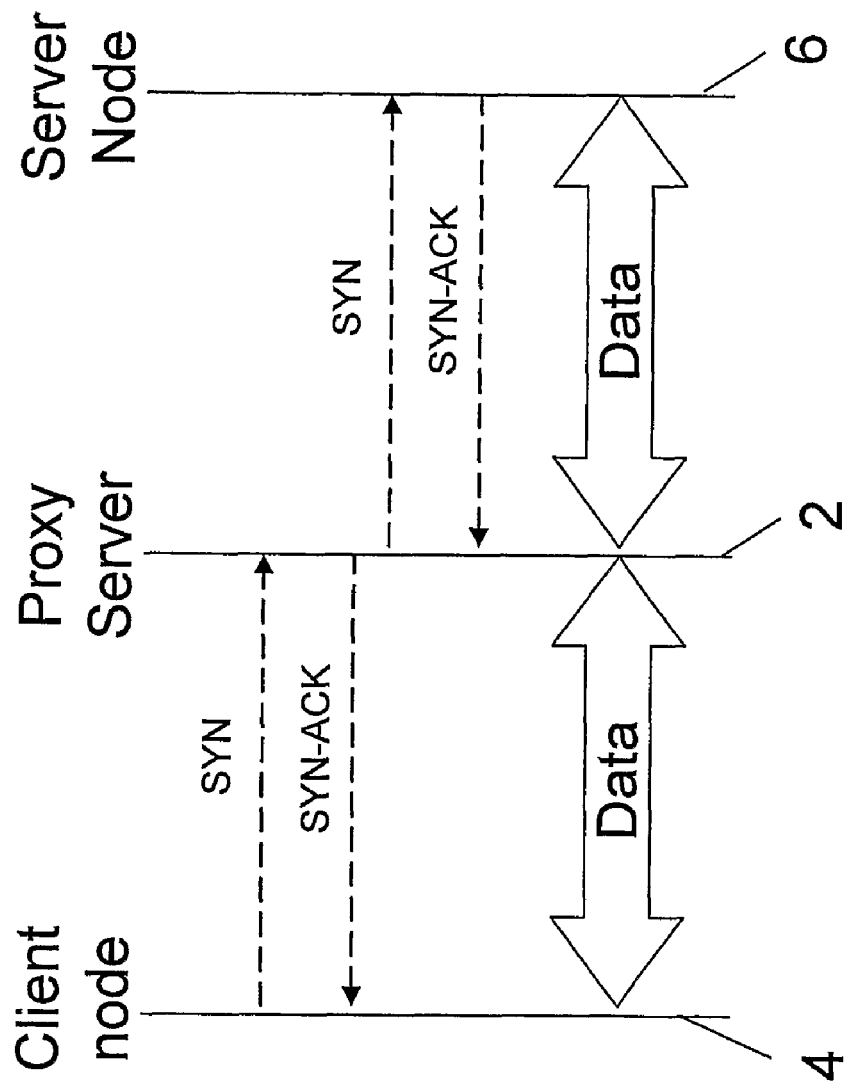
FIG. 1 is a schematic diagram showing a conventional TCP setup.

With reference to FIG. 1, a conventional TCP Session Setup of the prior art is shown. Traditionally, a proxy server 2 sits on a node of a network and intercepts data passing on the network, between the client node 4 and the server node 6, redirecting it.

The present invention relates to an interceptor which is an improvement on a traditional proxy server 2 in that data between nodes is passively monitored, and the interceptor on a node of the network synchronizes itself with the data being transferred so that it can seamlessly step in. Any network node using one of the methods of the invention, described herein below, will be able to select the sessions it wishes to intercept while referring to additional parameters as: dynamic protocol identification, session state, interceptor current capabilities and other network parameters. Using selective interception, an interception unit may intercept a particular protocol that is using dynamic TCP ports without having to intercept the sessions of all passing protocols. Additionally, such an interception unit may be configured to intervene only when certain data, such as a message or command is transferred on a session without having to intercept communications of all passing sessions. Furthermore, such an interception unit may be configured to intervene only when a certain network state is reached. For example, in accordance with one embodiment of the invention, an efficient cache server for protocols using dynamic TCP ports is proposed. Such a cache server does not have to allocate system resources and intercept all passing sessions but rather may be set to intercept only sessions that are identified as using the specific protocol the cache is configured for.

Another embodiment relates to an efficient cache server that is configured to intercept sessions only when it detects a request for data within its local cache.

Another embodiment relates to an efficient cache server for protocols such that a connection between two network nodes does not necessarily result in an immediate data transfer.

Figure 2:
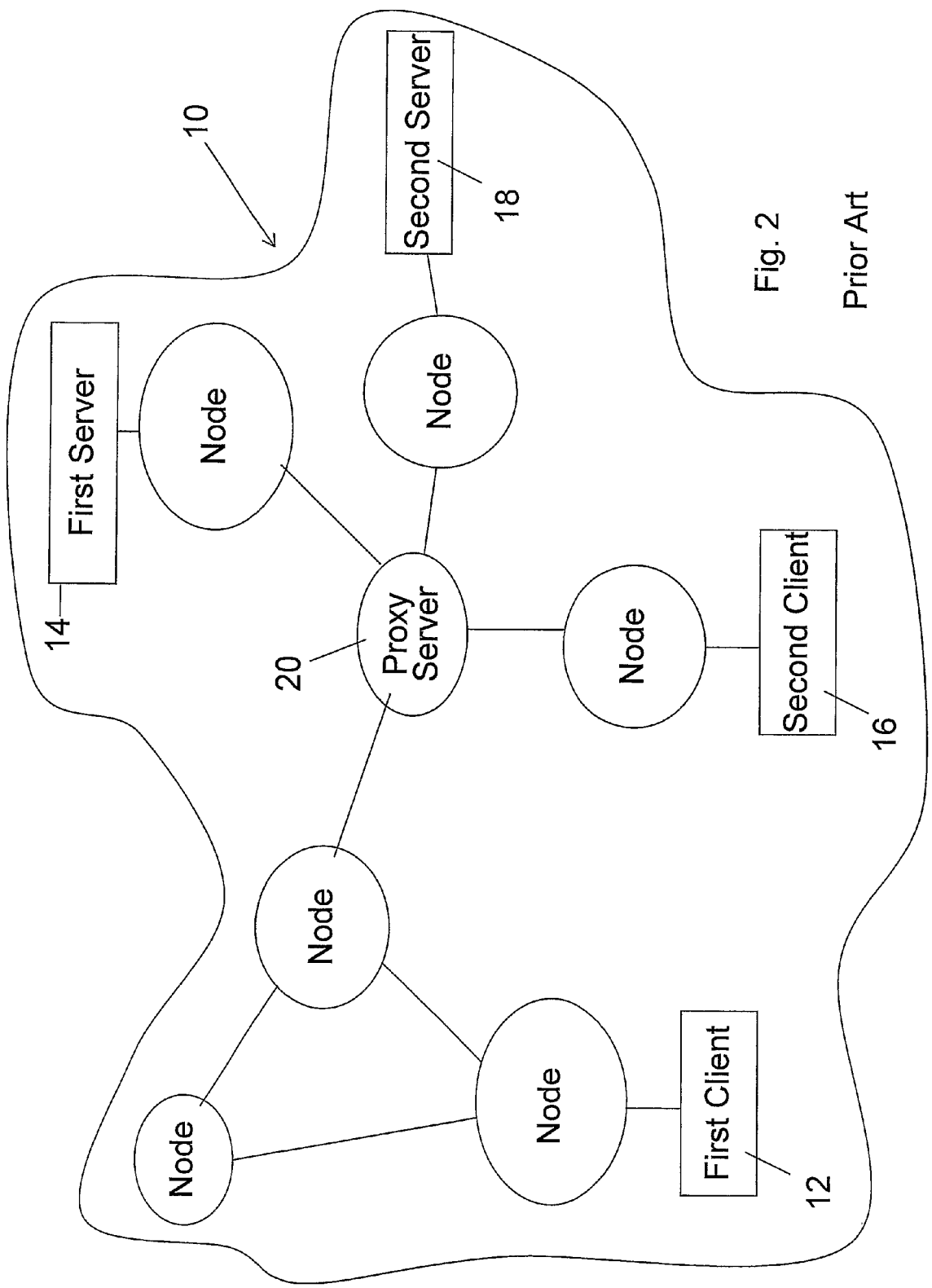
FIG. 2 is a schematic diagram of a telecommunication network.

With reference to FIG. 2, a prior art communication network 10 such as the Internet is shown. Data passes between nodes on the network 10: for example, between a first client 12 and a first server 14; between the first client 12 and a second client 16 and between the first server 14 and a second server 18. Data may be transferred directly and indirectly.

To allow load balancing, a proxy server 20 may be provided, to mediate between clients 12, 16 and/or servers 14, 18 in communication, by allowing data to be passed through the proxy server 20.

Figure 3:
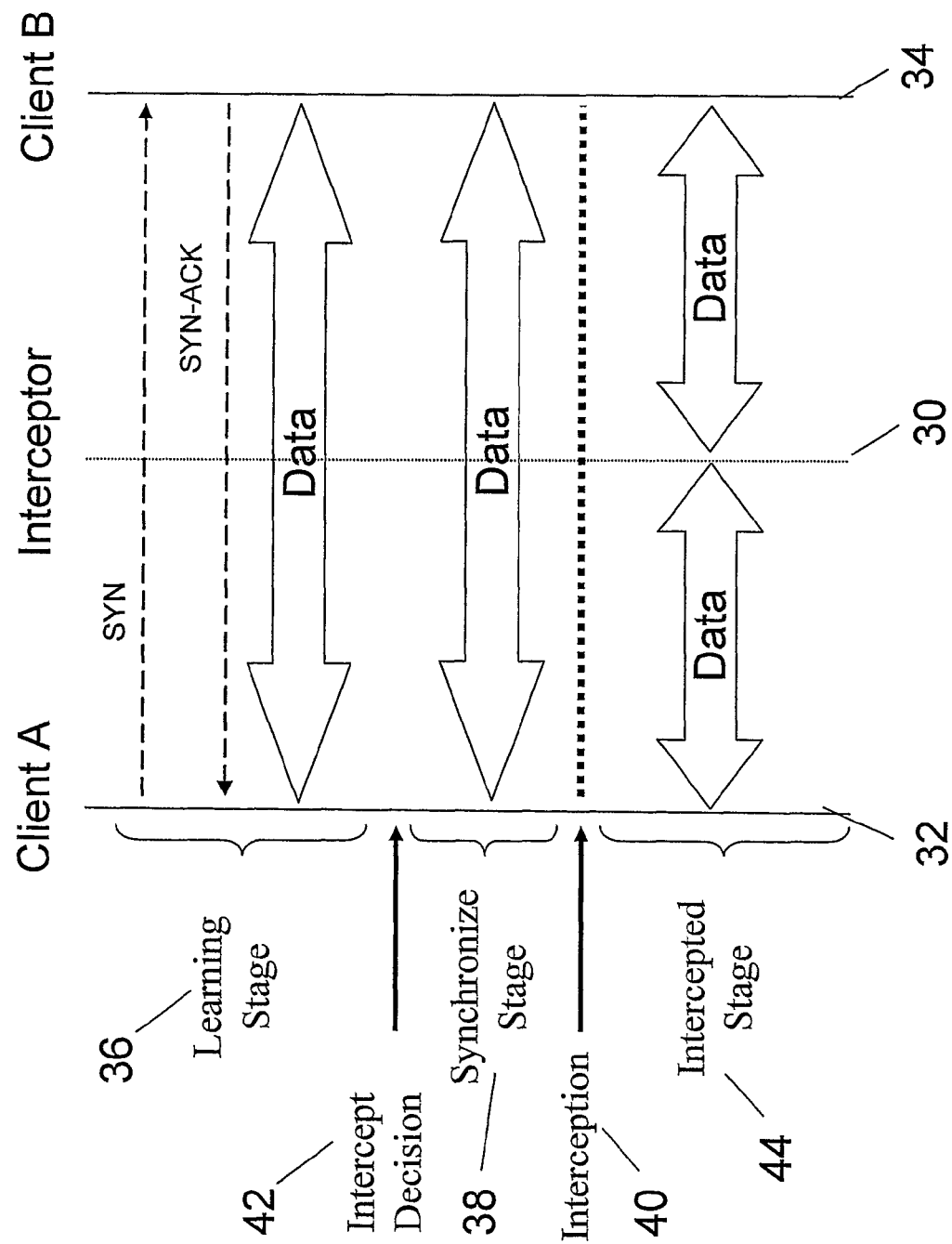
FIG. 3 is a schematic diagram showing an interceptor and its operation in accordance with a first embodiment of the invention.

With reference to FIG. 3, a proxy server of the invention, known herein below as an interceptor 30 intercepts data transmitted between two networked entities, shown here as Client A 32 and Client B 34.

Client A 32 is in communication with Client B 34. In a first stage, referred to herein below as the Learning Stage 36, a session is established between Client A 32 and Client B 34 with no intervention by the interceptor 30.

The interceptor 30 simply monitors the data passed between Client A 32 and Client B 34 during the session until a predetermined criterion is reached which causes the system to intercept the session. Examples of typical criteria include classification of the session to a certain protocol/application or identification of a certain protocol message, for example. However, other network criteria causing the passing of a minimal amount of data on the session may be used. Preferably during learning stage 36, any exchange of TCP options will be stored for use at the interception stage 40 described here below.

Following the predetermined criterion, a second stage, known herein as the Synchronize Stage 38 is initiated. During the Synchronize Stage 38 the interceptor 30 collects network data that enables it to intercept the session by creating two sockets. Preferably during the synchronize stage 38 the interceptor 30 collects at least some of the following data: IP address, TCP ports, TCP options, TCP window sizes, TCP sequence numbers, TCP acknowledgment numbers and un-acknowledged data. It will be noted that data is collected both for traffic going from Client A 32 to Client B 34, and for the traffic going from Client B 34 to Client A 32. The Synchronize Stage 38 may be performed in parallel to the Learning Stage 36 to enable immediate interception as soon as an Intercept Decision 42 is made.

In a third stage, referred to herein as Interception 40, the system identifies that it can transparently intercept the session and two sockets are created: A first socket to handle the communication with Client A 32 and a second socket to handle communication with Client B 34.

To transparently intercept the session the system is preferably aware of the following information for each socket it creates:
   a) Next sequence number to be transmitted
   b) First byte the socket is waiting an ACK for
   c) Received TCP window size
   d) The un-acknowledged data previously sent in the corresponding direction.

Once the session is intercepted, it can be manipulated by the system. Once interception 40 occurs, an Intercepted Stage 44 is entered wherein data is transferred between Client A 32 and Interceptor 30, and between Interceptor 30 and client B 34.

Figure 4:
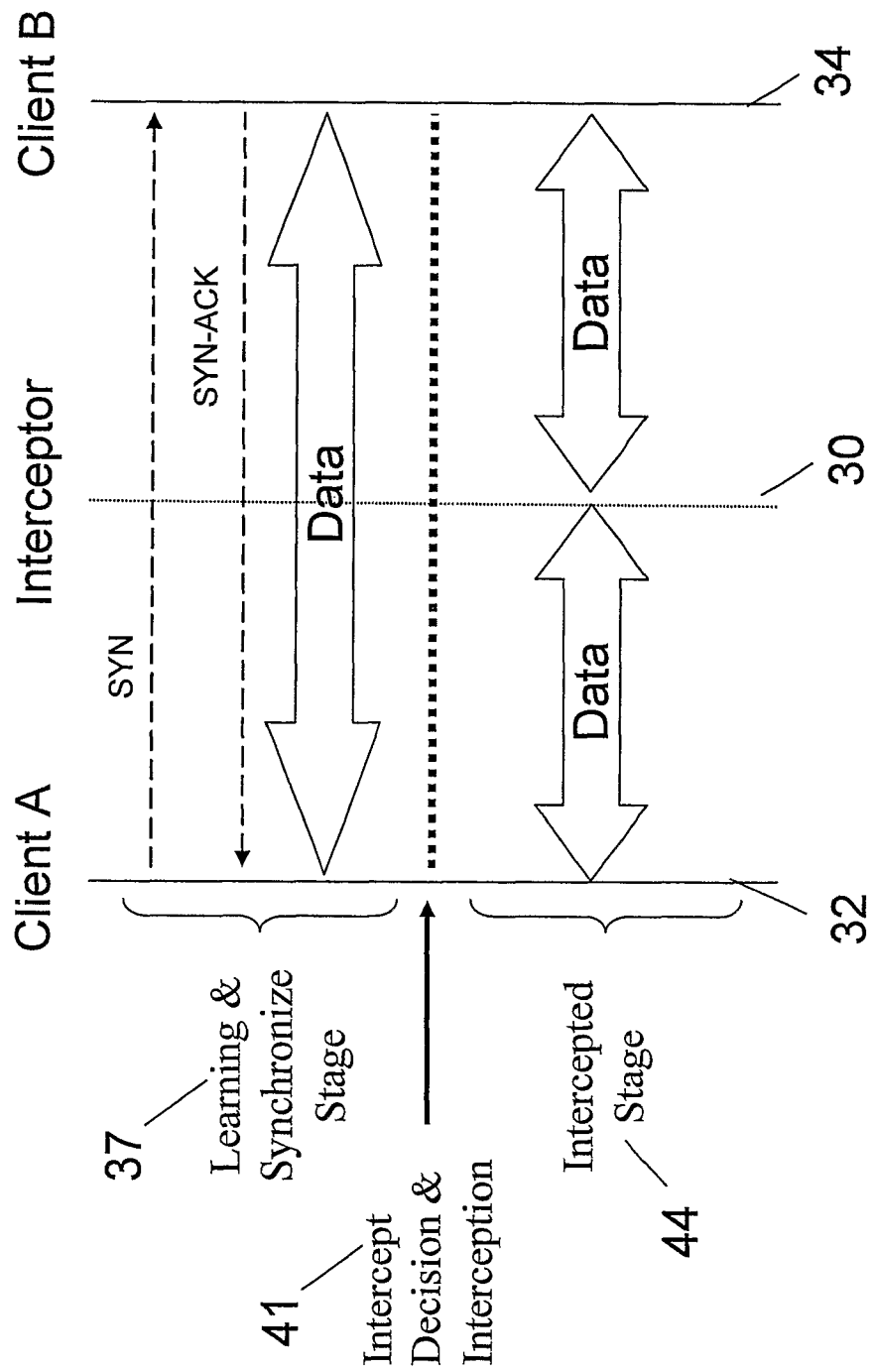
FIG. 4 is a schematic diagram showing an interceptor and its operation in accordance with a second embodiment of the invention where selective session interception occurs immediately.

As shown in FIG. 4, the Learning Stage and the Synchronize Stage may be combined to provide a Learning and Synchronize Stage 37, to enable immediate interception as soon as a decision to intercept 41 based on the appropriate criterion is made.

Figure 5:
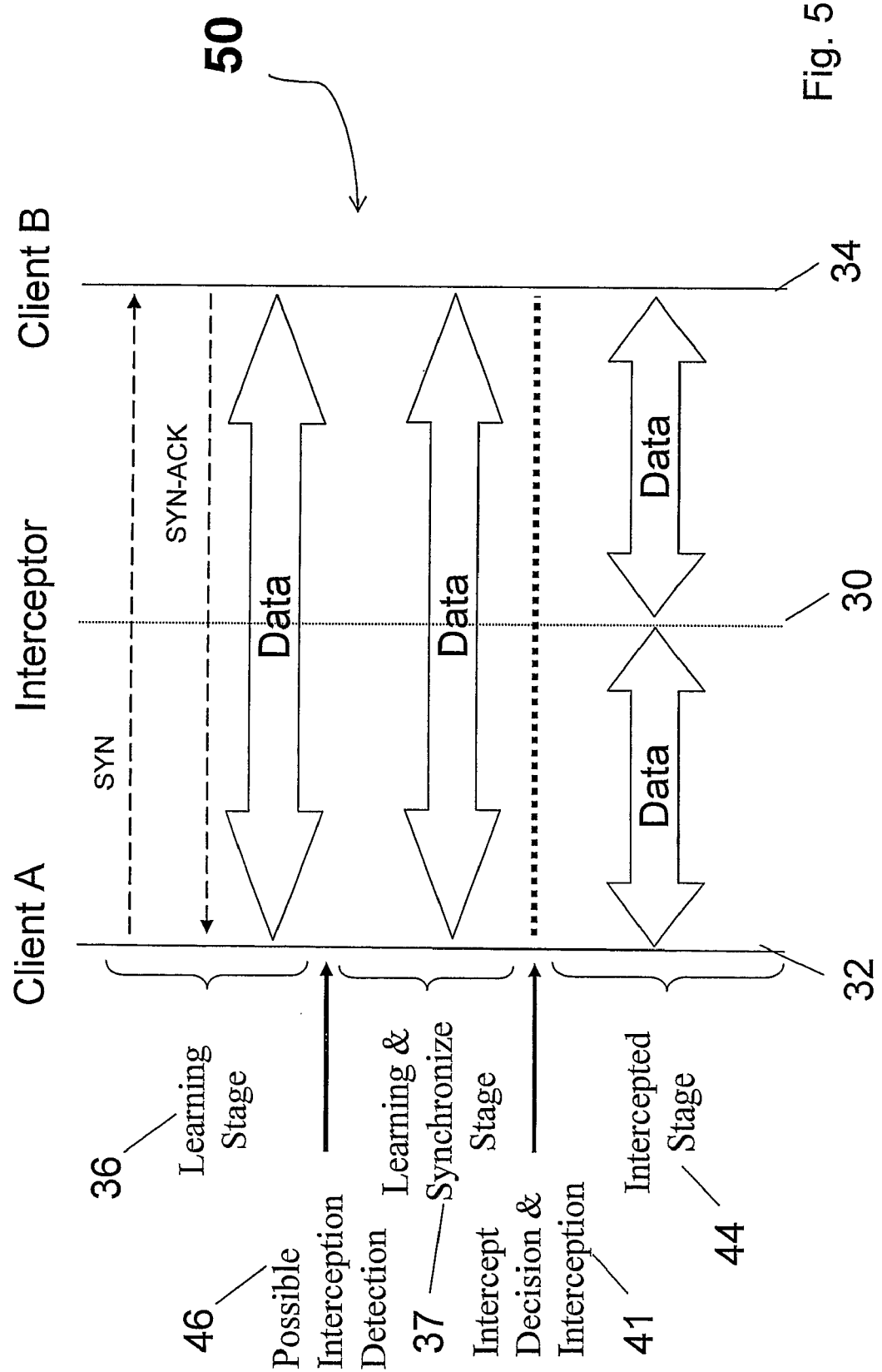
FIG. 5 is a schematic diagram showing an interceptor and its operation in accordance with a third embodiment of the invention showing efficient immediate selective session interception.

With reference to FIG. 5, an Efficient Immediate Selective Session Interception Mode 50 may be used to enable two levels of session screening. The first screening level uses minimal system resources and is used to identify possible sessions that might be intercepted 46, perhaps by detecting all sessions from a given protocol, for example. The second screening stage uses more system resources in order to enable an immediate session interception by making and implementing an Intercept Decision 41.

In contradistinction to traditional proxy servers that have to replace traditional servers at the start of a communication session, the interceptor 30 and methods of usage thereof as disclosed herein enable sessions to be intercepted at other times, not only contiguous to the session establishment time. A network node serving as an interceptor 30 and using the method outlined herein will be able to select sessions it wishes to intercept while referring to additional parameters such as: dynamic protocol identification, session state and interceptor current capabilities.

Figure 6:
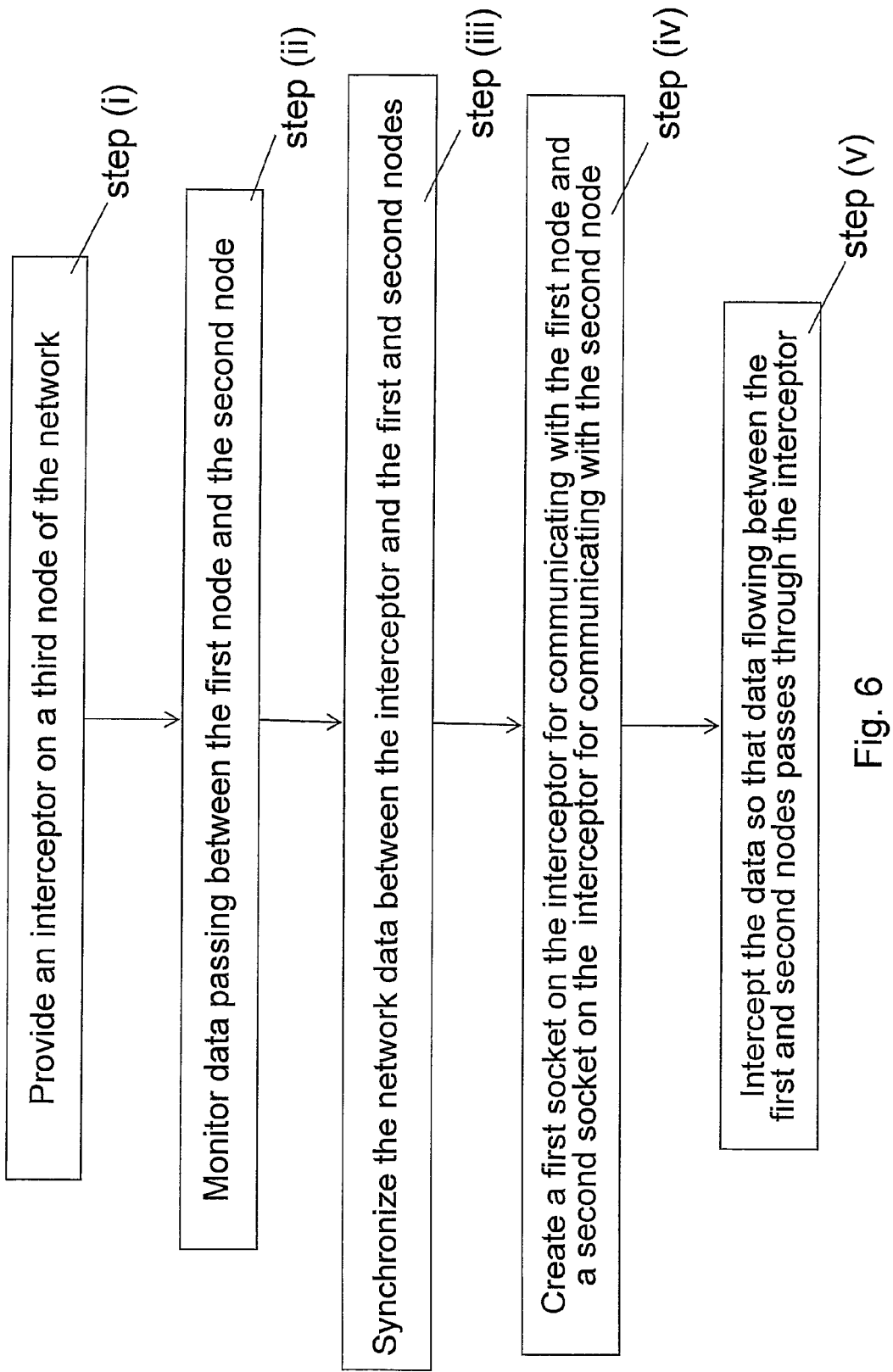
FIG. 6 is a simplified flow chart illustrating the procedure of selective session interception according to a preferred embodiment of the present invention.

With reference to FIG. 6, the present invention is thus directed to a method for intercepting data of a network session passing between a first node and a second node on a data network, comprising the steps of: providing an interceptor on a third node of the network—step (i); monitoring data passing between the first node and the second node—step (ii); synchronizing the network data between the interceptor and the first and second nodes—step (iii); creating a first socket on the interceptor for communicating with the first node and a second socket on the interceptor for communicating with the second node—step (iv) and intercepting the data so that data flowing between first and second nodes passes through the interceptor—step (v).

The technology described hereinabove allows the following improvements to traditional approaches:
a) Using selective interception in this manner, an interceptor may intercept a particular protocol using dynamic TCP ports without having to intercept the sessions of all passing protocols.
b) Such an interceptor might intervene only when certain data, perhaps a message or a command, is transferred during a session, without having to intercept passing data from all other sessions.
c) The interceptor may be set to intervene only when a certain network state is reached.
d) The interceptor unit and the methods described hereinabove, could be used to create an efficient cache server for protocols using dynamic TCP ports, for example.
e) The technology may be used to create an efficient cache server that intercepts sessions only when it detects a request for locally cached data.
f) The technology may be used to create an efficient cache server for protocols that a connection between two network nodes does not necessarily resolve by an immediate data transfer.

It will be appreciated that the inventive concept described herein may be used to create an efficient transparent encryption system by using two interceptors located at different network locations such that the first interceptor encrypts the data passing on the session, and the second interceptor decrypts the data.

Similarly, the technology described herein could be used to create an efficient transparent network optimization system by using two interceptors located at different network locations such that the first interceptor compresses the data passing on the session, and the second interceptor decompresses the compressed data.

Thus the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A method for intercepting data of network sessions passing between respective first node and second node on a data network, comprising the steps of:
(i) providing an interceptor on a third node of the network;
(ii) monitoring data passing between the first node and the second node, said monitoring being to select one of said network sessions;
(iii) synchronizing network data of the selected session between the interceptor and the respective first and second nodes;
(iv) creating a first port on the interceptor dedicated for communicating with the first node and a second port on the interceptor dedicated for communicating with the second node, and, using said dedicated ports, splitting said selected network session into two sessions, a first session between said first node and said interceptor and a second session between the interceptor and said second node, and
(v) intercepting the data so that data flowing between first and second nodes passes through the interceptor wherein said interceptor is configured to select said network session for interception using dynamic protocol identification and session state data.

2. The method of claim 1, wherein the ports comprise sockets.

3. The method of claim 1, wherein step (ii) comprises monitoring data going from the first node to the second node and monitoring data going from the second node to the first node.

4. The method of claim 1, wherein step (ii) comprises storing any passing TCP options.

5. The method of claim 1, wherein step (iii) of synchronizing the network data comprises collecting IP address, collecting TCP ports, collection TCP options, collecting TCP window sizes, collecting TCP sequence numbers, collecting TCP acknowledgment numbers and collecting un-acknowledged data.

6. The method of claim 1, wherein step (iv) of creating sockets and intercepting said session is not necessarily adjacent to a session establishment event.

7. The method of claim 1 wherein the first node is occupied by equipment acting as either a Client or a Server.

8. The method of claim 1 wherein the second node is occupied by equipment acting as either a Client or a Server.

9. The method of claim 1 wherein the synchronizing is performed in parallel to the monitoring stage thereby enabling immediate interception as soon as a decision to intercept is made.

10. The method of claim 1 further comprising using said interceptor with protocols for dynamic TCP ports.

11. The method of claim 1 wherein said intercepting is carried out only when predetermined data is transferred during a session, without intercepting passing data from other sessions.

12. The method of claim 11 wherein said predetermined data comprises a message or a command.

13. The method of claim 1 wherein said intercepting is carried out with data transmitted between the first node and the second node only when a predetermined network state is reached.

14. The method of claim 1 wherein the interceptor intercepts sessions only when it detects a request for data in its local cache, thereby providing an efficient cache server.

15. The method of claim 1 being used with protocols where connection between the first node and the second node does not result in an immediate transfer of data there between.

16. The method of claim 1 comprising using two interceptors located at different network locations such that the first interceptor encrypts data passing in the session, and the second interceptor decrypts the data.

17. The method of claim 1 comprising using two interceptors located at different network locations, wherein the first interceptor compresses the data passing on the session, and the second decompresses the compressed data.

* * * * *